United States Patent
Liu et al.

(10) Patent No.: US 12,418,382 B2
(45) Date of Patent: Sep. 16, 2025

(54) DEFAULT BEAM DETERMINATION

(71) Applicant: Lenovo (Beijing) Ltd., Beijing (CN)

(72) Inventors: Bingchao Liu, Changping District (CN); Chenxi Zhu, Haidian District (CN); Wei Ling, Changping (CN); Yi Zhang, Chao Yang District (CN); Lingling Xiao, Haidian District (BJ)

(73) Assignee: LENOVO (BEIJING) LIMITED, Beijing (CN)

( * ) Notice: Subject to any disclaimer, the term of this patent is extended or adjusted under 35 U.S.C. 154(b) by 489 days.

(21) Appl. No.: 17/917,700

(22) PCT Filed: Apr. 10, 2020

(86) PCT No.: PCT/CN2020/084205
§ 371 (c)(1),
(2) Date: Oct. 7, 2022

(87) PCT Pub. No.: WO2021/203414
PCT Pub. Date: Oct. 14, 2021

(65) Prior Publication Data
US 2023/0155783 A1    May 18, 2023

(51) Int. Cl.
*H04L 5/00* (2006.01)
*H04B 7/06* (2006.01)

(52) U.S. Cl.
CPC ....... *H04L 5/0053* (2013.01); *H04B 7/06968* (2023.05)

(58) Field of Classification Search
CPC . H04W 72/23; H04W 76/34; H04W 72/0446; H04W 92/10; H04L 5/0055; H04L 5/0098; H04L 5/0053; H04L 5/001
See application file for complete search history.

(56) References Cited

U.S. PATENT DOCUMENTS

2019/0306841 A1* 10/2019 Huang ................. H04L 5/0055
2021/0226688 A1*  7/2021 Khoshnevisan ... H04B 7/06964
(Continued)

FOREIGN PATENT DOCUMENTS

| CN | 110366250 A | 10/2019 |
| EP | 3547593 A1 | 10/2019 |

OTHER PUBLICATIONS

Asustek, "Discussion on support of cross-carrier scheduling with different numerology", 3GPP TSG RAN WG1 #100, R1-2000985, e-Meeting [retrieved Sep. 18, 2022]. Retrieved from the Internet <https://www.3gpp.org/ftp/tsg_ran/WG1_RL1/TSGR1_100_e/Docs>., Feb. 2020, 6 Pages.

(Continued)

*Primary Examiner* — Mahran Y Abu Roumi
(74) *Attorney, Agent, or Firm* — FIG. 1 Patents (57) ABSTRACT

Methods and apparatuses for determining default beam(s) are disclosed. A method comprises receiving an activation command for the activated BWP of a serving cell, wherein the activation command contains codepoints pointing to TCI state(s), and at least one codepoint points to two TCI states; and determining default TCI state(s) for reception of downlink signal according to the TCI state(s) used for receiving the PDCCH or at least one TCI state pointed to by a codepoint pointing to two TCI states, when a scheduling offset between a reception of the PDCCH carrying DCI and the corresponding downlink signal scheduled or triggered by the DCI is less than a predetermined threshold.

15 Claims, 3 Drawing Sheets

(56) References Cited

U.S. PATENT DOCUMENTS

| | | | |
|---|---|---|---|
| 2023/0114063 A1* | 4/2023 | Iwasaki | H02M 7/5387 363/13 |
| 2024/0405947 A1* | 12/2024 | Ling | H04L 5/0053 |

OTHER PUBLICATIONS

CMCC, "Maintenance for multi-TRP/panel transmission", 3GPP TSG RAN WG1 #100, R1-2000754, e-Meeting [retrieved Sep. 18, 2022]. Retrieved from the Internet <https://www.3gpp.org/ftp/tsg_ran/WG1_RL1/TSGR1_100_e/Docs>., Feb. 2020, 3 Pages.

PCT/CN2020/084205, "International Preliminary Report on Patentability", PCT Application No. PCT/CN2020/084205, Oct. 20, 2022, 7 pages.

PCT/CN2020/084205, "International Search Report and Written Opinion", PCT Application No. PCT/CN2020/084205, Dec. 28, 2020, 8 pages.

20930348.6, "Extended European Search Report", EP Application No. 20930348.6, Oct. 25, 2023, 16 pages.

3GPP, "Medium Access Control (MAC) protocol specification", 3GPP TS 38.321, Version 15.2.0 Release 15 [retrieved Jan. 18, 2024]. Retrieved from the Internet <https://www.etsi.org/deliver/etsi_ts/138300_138399/138321/15.02.00_60/ts_138321v150200p.pdf> 1 of 2, Sep. 2018, 74 pages.

3GPP, "Medium Access Control (MAC) protocol specification", 3GPP TS 38.321, Version 15.2.0 Release 15 [retrieved Jan. 18, 2024]. Retrieved from the Internet <https://www.etsi.org/deliver/etsi_ts/138300_138399/138321/15.02.00_60/ts_138321v150200p.pdf> 2 of 2, Sep. 2018, 74 pages.

Nokia, "Corrections on Cross-carrier Scheduling with Different Numerologies", 3GPP TSG-RAN WG1 Meeting #100, R1-2001443, e-meeting [retrieved Jan. 18, 2024]. Retrieved from the Internet <https://www.3gpp.org/ftp/tsg_ran/wg1_rl1/TSGR1_100_e/Docs/?sortby=daterev>., Feb. 2020, 10 pages.

Oppo, "Outcome of email thread [100e-NR-eMIMO-multiTRP-01]", 3GPP TSG RAN WG1#100-e, R1-2001377, e-Meeting [retrieved Jan. 16, 2024]. Retrieved from the Internet <https://www.3gpp.org/ftp/tsg_ran/WG1_RL1/TSGR1_100_e/Docs>, Feb. 2020, 14 pages.

202080099056.0, "Foreign Office Action", CN Application No. 202080099056.0, Jun. 27, 2024, 24 pages.

"Foreign Office Action", EP Application No. 20930348.6, Feb. 5, 2025, 10 pages.

* cited by examiner

DEFAULT BEAM DETERMINATION

FIELD

The subject matter disclosed herein generally relates to wireless communications, and more particularly relates to methods and apparatuses for determining default beam(s) for downlink signal reception transmitted from multiple TRPs.

BACKGROUND

The following abbreviations are herewith defined, at least some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Orthogonal Frequency Division Multiplexing (OFDM), Radio Resource Control (RRC), Time-Division Duplex (TDD), Time Division Multiplex (TDM), User Entity/Equipment (Mobile Terminal) (UE), Uplink (UL), Universal Mobile Telecommunications System (UMTS), Physical Downlink Shared Channel (PDSCH), Physical Uplink Shared Channel (PUSCH), Physical Uplink Control Channel (PUCCH), Downlink control information (DCI), transmission reception point (TRP), multiple TRP (multi-TRP or M-TRP), frequency range 2 (FR2), Quasi Co-Location (QCL), channel state information reference signal (CSI-RS), Code Division Multiplexing (CDM), Transmission Configuration Indication (TCI), Control Resource Set (CORESET), reference signal (RS), component carrier (CC), band width part (BWP), non-coherent joint transmission (NCJT), Media Access Control Control Element (MAC CE).

Default TCI state or QCL assumption for the reception of downlink signals, e.g. PDSCH and aperiodic CSI-RS resource(s), is an important feature in NR Release 15 and Release 16, when the scheduling or triggering time offset is less than a threshold determined according to UE capability reporting for in-carrier and cross-carrier scheduling PDSCH and for cross-carrier triggering aperiodic CSI-RS resource(s). For example, for a PDSCH transmission scheduled by a DCI, the TCI state(s) for the reception of the PDSCH can be indicated by the 'Transmission Configuration Indication' field (i.e. TCI field) contained in the DCI. However, when the time offset between the reception of the DCI scheduling a PDSCH and the reception of the scheduled PDSCH transmission is less than a threshold determined according to UE capability reporting (e.g. timeDuration-ForQCL), the UE will not have enough time to decode the DCI to obtain and change the TCI state for the reception of the scheduled PDSCH and adjust the beam to correspond to the obtained TCI state(s). In this condition, one or more default TCI states have to be determined in FR2. In other words, the UE reported capability (e.g. timeDuration-ForQCL) indicates the time duration required by the UE for QCL determination.

Single-DCI based multi-TRP DL transmission mode is introduced in NR Release 16 for cell-edge UEs for high throughput and/or reliable transmission. The PDSCH can be scheduled to be transmitted from two TRPs by two potential DL beams in FR2 in non-coherent joint transmission (NCJT) mode.

The higher layer parameter tci-PresentInDCI or tci-PresentInDCI-ForFormat1_2 indicates whether 'Transmission Configuration Indication' field (i.e. TCI field) is contained in the DCI with format 1_1 or 1_2. The TCI field is used to indicate the TCI state(s) for the scheduled PDSCH reception. The TCI field is of 3 bits with eight possible values (also referred to as eight codepoints). Each codepoint may point to one or two TCI states. Especially, two TCI states can be pointed to by the TCI field in DCI format 1_1 and DCI format 1_2 for PDCSH reception in NCJT mode. An activation command is received at the UE to indicate the one or two TCI states pointed to by each of the eight codepoints.

In a scenario that (1) scheduling offset (i.e. the time offset between the reception of the PDCCH carrying DCI and the PDSCH scheduled by the DCI) is less than a threshold for in-carrier scheduled PDSCH reception, i.e. the PDCCH carrying the DCI and the scheduled PDSCH are transmitted in the same carrier; (2) an activation command (e.g. a PDSCH TCI state activation/deactivation MAC CE) is received to indicate eight codepoints at least one of which points to two TCI states (the others of which may point to one or two TCI states); and (3) TCI field is configured to be presented in the scheduling DCI for all the CORESETs (i.e. tci-PresentInDCI is set as 'enable' for each of the CORESETs or tci-PresentInDCI-ForFormat1_2 is configured for all the CORESETs), the default beam(s) (i.e. the default TCI state(s), or the default QCL assumption(s)) for the reception of the scheduled PDSCH transmission are specified in NR Release 16. In particular, the TCI states pointed to by the lowest codepoint among the codepoints containing two different TCI states are determined as the default TCI states.

However, tci-PresentInDCI or tci-PresentInDCI-ForFormat1_2 is configured per CORESET, while PDSCH TCI states are activated per BWP by the MAC CE activation command. Therefore, there may exist a scenario in which tci-PresentInDCI or tci-PresentInDCI-ForFormat1_2 is not configured for all CORESETs configured for the active BWP (i.e. some CORESETs are configured with tci-PresentInDCI set as 'enable' or tci-PresentInDCI-ForFormat1_2 while some other CORESETs are not configured with tci-PresentInDCI or tci-PresentInDCI-ForFormat1_2). In this condition, if at least one codepoint of the eight codepoints contained in the activation command (e.g. PDSCH TCI state activation/deactivation MAC CE) points to two TCI states, it is yet unknown what is/are the default TCI state(s) for the reception of the scheduled PDSCH.

In addition, the default TCI state for the reception of cross-carrier scheduled aperiodic CSI-RS resource(s), i.e. the PDCCH carrying the triggering DCI and the triggered aperiodic CSI-RS resource(s) are transmitted in different carriers, should also be determined considering potential NCJT DL transmission.

This disclosure targets for determining the default TCI state(s) for the reception of the scheduled PDSCH and aperiodic CSI-RS resource(s) in consideration of the potential single DCI based multi-TRP NCJT DL transmission for in-carrier and cross-carrier scheduling.

BRIEF SUMMARY

Methods and apparatuses for determining default beam(s) are disclosed.

In one embodiment, a method comprises receiving an activation command for the activated BWP of a serving cell, wherein the activation command contains codepoints pointing to TCI state(s), and at least one codepoint points to two TCI states; and determining default TCI state(s) for reception of downlink signal according to the TCI state(s) used for receiving the PDCCH or at least one TCI state pointed to by a codepoint pointing to two TCI states, when a scheduling offset between a reception of the PDCCH carrying DCI and the corresponding downlink signal scheduled or triggered by the DCI is less than a predetermined threshold.

In one embodiment, the downlink signal is PDSCH scheduled by the DCI carried in the PDCCH transmitted on the same carrier as that of the PDSCH. In this condition, the default TCI state(s) for reception of the scheduled PDSCH may be determined by the PDCCH QCL indication of the CORESET associated with a monitored search space with the lowest ControlResourceSetId in the latest slot in which one or more CORESETs within the active BWP of the serving cell are monitored, or may be determined by a first TCI state pointed to by the lowest codepoint among the codepoints pointing to two different TCI states, when tci-PresentInDCI or tci-PresentInDCI-ForFormat1_2 is not configured for the CORESET transmitting the DCI scheduling the PDSCH. The default TCI states for reception of the scheduled PDSCH may be determined by the TCI states pointed to by the lowest codepoint among the codepoints pointing to two different TCI states, when tci-PresentInDCI is set to "enabled" or tci-PresentInDCI-ForFormat1_2 is configured for the CORESET transmitting the DCI scheduling the PDSCH. Alternatively, the default TCI state for reception of the scheduled PDSCH may be determined by a first TCI state pointed to by the lowest codepoint among the codepoints pointing to two different TCI states, no matter whether tci-PresentInDCI or tci-PresentInDCI-ForFormat1_2 is configured for the CORESET transmitting the DCI scheduling the PDSCH or not.

In another embodiment, the downlink signal is PDSCH scheduled by the DCI carried in the PDCCH transmitted on a different carrier from that of the PDSCH. In this condition, the default TCI states for reception of the scheduled PDSCH are determined by the TCI states pointed to by the lowest codepoint among the codepoints pointing to two different TCI states, no matter whether tci-PresentInDCI or tci-PresentInDCI-ForFormat1_2 is configured for the CORESET transmitting the DCI scheduling the PDSCH or not. Alternatively, the default TCI state for reception of the scheduled PDSCH may be determined by a first TCI state pointed to by the lowest codepoint among the codepoints pointing to two different TCI states, no matter whether tci-PresentInDCI or tci-PresentInDCI-ForFormat1_2 is configured for the CORESET transmitting the DCI scheduling the PDSCH or not.

In some embodiment, the downlink signal is an aperiodic CSI-RS triggered by the DCI carried in the PDCCH transmitted on a different carrier from that of the aperiodic CSI-RS. In this condition, the default TCI state for reception of the triggered aperiodic CSI-RS resource(s) may be determined by a first TCI state pointed to by the lowest codepoint among the codepoints pointing to two different TCI states, when the time offset between the last symbol of the PDCCH carrying the triggering DCI and the first symbol of the aperiodic CSI-RS resource(s) configured without a higher layer parameter trs-Info and without a higher layer parameter repetition is smaller than the predetermined threshold.

In another embodiment, a remote unit comprises a receiver that receives an activation command for the activated BWP of a serving cell, wherein the activation command contains codepoints pointing to TCI state(s), and at least one codepoint points to two TCI states; and a processor that determines default TCI state(s) for reception of downlink signal according to the TCI state(s) used for receiving the PDCCH or at least one TCI state pointed to by a codepoint pointing to two TCI states, when a scheduling offset between a reception of the PDCCH carrying DCI and the corresponding downlink signal scheduled or triggered by the DCI is less than a predetermined threshold.

In one embodiment, a method comprises transmitting an activation command for the activated BWP of a serving cell, wherein the activation command contains codepoints pointing to TCI state(s), and at least one codepoint points to two TCI states; and determining default TCI state(s) for reception of downlink signal according to the TCI state(s) used for receiving the PDCCH or at least one TCI state pointed to by a codepoint pointing to two TCI states, when a scheduling offset between a reception of the PDCCH carrying DCI and the corresponding downlink signal scheduled or triggered by the DCI is less than a predetermined threshold.

In yet another embodiment, a base unit comprises a transmitter that transmits an activation command for the activated BWP of a serving cell, wherein the activation command contains codepoints pointing to TCI state(s), and at least one codepoint points to two TCI states; and a processor that determines default TCI state(s) for reception of downlink signal according to the TCI state(s) used for receiving the PDCCH or at least one TCI state pointed to by a codepoint pointing to two TCI states, when a scheduling offset between a reception of the PDCCH carrying DCI and the corresponding downlink signal scheduled or triggered by the DCI is less than a predetermined threshold.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

A first embodiment relates to determining the default TCI state(s) for in-carrier PDSCH scheduling in NCJT mode.

According to the first embodiment, the default TCI state(s) for the reception of the scheduled PDSCH are determined when the following three conditions are met:
(1) A DCI carried in PDCCH schedules a PDSCH transmitted on the same carrier as that of the PDCCH (i.e. in-carrier scheduled PDSCH). The scheduled PDSCH may be sent from one or two TRPs. The scheduling offset (i.e. the time offset between the reception of the PDCCH carrying the DCI and the scheduled PDSCH) is less than a threshold 'timeDurationForQCL'.
(2) The PDCCH is transmitted in one of the CORESETs within the active BWP of the serving cell monitored by the UE. Some CORESETs are configured with tci-PresentInDCI set as 'enable' or tci-PresentInDCI-ForFormat1_2 while some other CORESETs are not configured with tci-PresentInDCI or tci-PresentInDCI-ForFormat1_2.
(3) An activation command (e.g. a PDSCH TCI state activation/deactivation MAC CE) is received to indicate eight codepoints pointing to TCI state(s) to be activated. At least one codepoint points to two different TCI states; and each of the other codepoints may point to one or two TCI states.

According to the first embodiment, the default TCI state(s) for the reception of the scheduled PDSCH are determined differently for the CORESET transmitting the DCI scheduling the PDSCH for which tci-PresentInDCI or tci-PresentInDCI-ForFormat1_2 is not configured and for the CORESET transmitting the DCI scheduling the PDSCH for which tci-PresentInDCI set as 'enable' or tci-PresentInDCI-ForFormat1_2 is configured. Note that a CORESET identifies a set of time-frequency resources for the transmission of PDCCH and each CORESET has a ControlResourceSetId.

In particular, for the CORESET transmitting the DCI scheduling the PDSCH for which tci-PresentInDCI or tci-PresentInDCI-ForFormat1_2 is not configured, the default TCI state(s) for the reception of the scheduled PDSCH are determined by the TCI state(s) for the reception of the PDCCH. In particular, the UE may assume that the DM-RS ports of the scheduled PDSCH of a serving cell are quasi co-located (hereinafter, abbreviated as "QCLed") with the RS(s) with respect to the QCL parameter(s) used for PDCCH QCL indication of the CORESET associated with a monitored search space with the lowest ControlResourceSetId in the latest slot in which one or more CORESETs within the active BWP of the serving cell are monitored by the UE.

On the other hand, for the CORESET transmitting the DCI scheduling the PDSCH for which tci-PresentInDCI set as 'enable' or tci-PresentInDCI-ForFormat1_2 is configured, the default TCI state(s) for the reception of the scheduled PDSCH are determined by ones of the TCI states activated in the activation command (e.g. PDSCH TCI state activation/deactivation MAC CE). In particular, when at least one of configured TCI states for the serving cell of scheduled PDSCH contains the 'QCL-TypeD', the UE may assume that DM-RS ports of the scheduled PDSCH of a serving cell are QCLed with the RS(s) with respect to the QCL parameter(s) associated with the TCI states pointed to by the lowest codepoint among the codepoints pointing to two different TCI states. Incidentally, when none of the configured TCI states for the serving cell of scheduled PDSCH contains the 'QCL-TypeD', the UE shall obtain the other QCL assumptions from the indicated TCI states for its scheduled PDSCH irrespective of the time offset between the reception of the DL DCI and the corresponding PDSCH and no default beam is necessary to be determined.

The expression "are QCLed with the RS(s) with respect to the QCL parameter(s) associated with the TCI state" is further explained as follows:

The UE can be configured with a list of up to M TCI state configurations to decode PDSCH according to a detected PDCCH with DCI intended for the UE and the given serving cell, where M depends on the UE capability. The TCI state is configured by the following RRC signaling:

---

-     TCI state

The IE TCI state associates one or two DL reference signals with a corresponding quasi-colocation (QCL) type.

TCI state information element

-- ASN1START
-- TAG-TCI STATE-START

-continued

```
TCI state ::=              SEQUENCE {
  TCI stateId                TCI stateId,
  qcl-Type1                  QCL-Info,
  qcl-Type2                  QCL-Info
OPTIONAL,    -- Need R
  ...
}
QCL-Info ::=               SEQUENCE {
  cell                       ServCellIndex
OPTIONAL,    -- Need R
  bwp-Id                     BWP-Id
OPTIONAL, -- Cond CSI-RS-Indicated
  referenceSignal            CHOICE {
    csi-rs                     NZP-CSI-RS-ResourceId,
    ssb                        SSB-Index
  },
  qcl-Type                   ENUMERATED {typeA, typeB, typeC, typeD},
  ...
}
-- TAG-TCI STATE-STOP
-- ASN1STOP
```

Each TCI state contains parameters for configuring a quasi co-location (QCL) relationship between one or two downlink reference signals (i.e. RS(s)) and the DM-RS ports of the PDSCH, the DM-RS port of PDCCH or the CSI-RS port(s) of a CSI-RS resource. The quasi co-location relationship is configured by the higher layer parameter qcl-Type1 for the first downlink RS, and qcl-Type2 for the second downlink RS (if configured). For the case of two downlink RSs, the QCL types shall not be the same, regardless of whether the references are to the same downlink RS or different downlink RSs. The quasi co-location types (i.e. QCL parameter(s)) corresponding to each downlink RS are given by the higher layer parameter qcl-Type in QCL Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if a TCI state is configured as TCI state={CSI-RS #1, QCL-TypeA; CSI-RS #2, QCL-TypeD} and it is indicated for a PDSCH reception, it means that the UE may assume that the Doppler shift, Doppler spread, average delay, delay spread for the DM-RS ports of the PDSCH are the same as those estimated by CSI-RS #1 and the UE may receive the PDSCH and the corresponding DM-RS port using the same spatial RX parameter as that used to receive CSI-RS #2. We can say that "the UE may assume that the DM-RS ports of the scheduled PDSCH are quasi co-located (i.e. QCLed) with CSI-RS #1 with respect to 'QCL-TypeA', and quasi co-located with CSI-RS #2 with respect to 'QCL-TypeD'" (or abbreviated as "QCLed with the RS(s) with respect to the QCL parameter(s) associated with the indicated TCI state"). In other words, the QCL assumption of the DM-RS ports of the scheduled PDSCH (for the reception of the PDSCH) is determined according to the indicated TCI state.

The activation command (e.g. PDSCH TCI state activation/deactivation MAC CE) received by the UE is used to map up to eight different TCI states to the codepoints of the DCI field 'Transmission Configuration Indication' (i.e. TCI field) in one DL BWP of a serving cell. When a UE supports that two TCI states are pointed to by a codepoint of the TCI field, the activation command may be used to map up to 8 combinations of one or two different TCI states to the codepoints of the TCI field.

An example of the first embodiment is described as follows:

Suppose that the following PDSCH TCI state activation/deactivation MAC CE is received for the current active BWP of the serving cell, and at least one of configured TCI states for the serving cell of scheduled PDSCH contains the 'QCL-TypeD':

```
{
  TCI field with value of '000' codepoint points to TCI state#1,
  TCI field with value of '001' codepoint points to TCI state#2,
  TCI field with value of '010' codepoint points to TCI state#5 and TCI state#8,
  TCI field with value of '011' codepoint points to TCI state#11,
  TCI field with value of '100' codepoint points to TCI state#38,
  TCI field with value of '101' codepoint points to TCI state#52,
  TCI field with value of '110' codepoint points to TCI state#65 and TCI state#88,
  TCI field with value of '111' codepoint points to TCI state#110
}
```

Three CORESETs, e.g. CORESET #1, CORESET #2 and CORESET #3, are configured for the activate BWP of a serving cell for a UE, where tci-PresentInDCI is not configured for CORESET #1, CORESET #2 and tci-PresentInDCI is set as 'enable' for CORESET #3.

If a UE receives a DCI with format 1_1 scheduling a PDSCH transmission with scheduling offset smaller than the threshold timeDurationForQCL, default TCI state(s) have to be determined.

According to the first embodiment, if a UE receives a DCI with format 1_1 transmitted from CORESET #1 scheduling a PDSCH with scheduling offset smaller than the threshold timeDurationForQCL, the UE may assume that the DM-RS ports of the scheduled PDSCH are QCLed with the RS(s) with respect to the QCL parameter(s) associated with the TCI state indicated to the CORESET associated with a monitored search space with the lowest ControlResourceSetId in the latest slot in which one or more CORESETs within the active BWP of the serving cell are monitored by the UE. That is, the default TCI state(s) are determined by the TCI state(s) for the reception of the PDCCH associated with a monitored search space with the lowest ControlResourceSetId in the latest slot in which one or more CORESETs within the active BWP of the serving cell are monitored by the UE, irrespective of the activation command.

On the other hand, according to the first embodiment, if a UE receives a DCI transmitted from CORESET #3 scheduling a PDSCH with scheduling offset smaller than the threshold timeDurationForQCL, the UE may assume that the DM-RS ports of the scheduled PDSCH are QCLed with the RS(s) with respect to the QCL parameter(s) associated with TCI state #5 and TCI state #8, as the codepoint '010' is the lowest codepoint that points to two different TCI states.

A second embodiment relates to another option for determining the default TCI state(s) for in-carrier PDSCH scheduling in NCJT mode.

According to the second embodiment, the default TCI state(s) for the reception of the scheduled PDSCH are determined when the same three conditions as in the first embodiment are met.

The second embodiment differs from the first embodiment in that the default TCI state(s) for the reception of the scheduled PDSCH are determined in a different manner for the CORESET transmitting the DCI scheduling the PDSCH for which tci-PresentInDCI or tci-PresentInDCI-ForFormat1_2 is not configured.

According to the first embodiment, the UE is required to maintain at least 3 different default beams for PDSCH reception, i.e. the beam for the CORESET, and the two beams corresponding to two default TCI states. This requires high capability of a UE. To reduce the number of the beams maintained by the UE, according to the second embodiment, for the CORESET transmitting the DCI scheduling the PDSCH for which tci-PresentInDCI or tci-PresentInDCI-ForFormat1_2 is not configured, the default TCI state for the reception of the scheduled PDSCH is determined by one of the TCI states activated in the activation command (e.g. PDSCH TCI state activation/deactivation MAC CE). In particular, when at least one of configured TCI states for the serving cell of scheduled PDSCH contains the 'QCL-TypeD', the UE may assume that the DM-RS ports of the scheduled PDSCH of a serving cell are QCLed with the RS(s) with respect to the QCL parameter(s) associated with one TCI state (preferably the first TCI state) pointed to by the lowest codepoint among the codepoints pointing to two different TCI states.

For the CORESET transmitting the DCI scheduling the PDSCH for which tci-PresentInDCI set as 'enable' or tci-PresentInDCI-ForFormat1_2 is configured, the default TCI state(s) for the reception of the scheduled PDSCH are determined in the same manner as in the first embodiment. That is, when at least one of configured TCI states for the serving cell of scheduled PDSCH contains the 'QCL-TypeD', the UE may assume that the DM-RS ports of the scheduled PDSCH of a serving cell are QCLed with the RS(s) with respect to the QCL parameter(s) associated with the TCI states pointed to by the lowest codepoint among the codepoints pointing to two different TCI states. As a whole, according to the second embodiment, at most two different beams corresponding to two default TCI states are maintained by the UE.

An example of the second embodiment is described as follows:

Suppose that the same PDSCH TCI state activation/deactivation MAC CE as in the first embodiment is received for the current active BWP of the serving cell.

Also the same as the first embodiment, three CORESETs, e.g. CORESET #1, CORESET #2 and CORESET #3, are configured for the activate BWP of the serving cell for a UE, where tci-PresentInDCI is not configured for CORESET #1, CORESET #2 and tci-PresentInDCI is set as 'enable' for CORESET #3.

According to the second embodiment, if a UE receives a DCI with format 1_1 transmitted from CORESET #1 or CORESET #2 scheduling a PDSCH with scheduling offset smaller than the threshold timeDurationForQCL, the UE may assume that the DM-RS ports of the scheduled PDSCH are QCLed with the RS(s) with respect to the QCL parameter(s) associated with TCI state #5 or TCI state #8. The TCI state #5 is preferable as it is the first TCI state of the TCI states pointed to by the lowest codepoint pointing to two different TCI states.

According to the second embodiment, if a UE receives a DCI with format 1_1 transmitted from CORESET #3 scheduling a PDSCH with scheduling offset smaller than the threshold timeDurationForQCL, the UE may assume that the DM-RS ports of the scheduled PDSCH are QCLed with the RS(s) with respect to the QCL parameter(s) associated with TCI state #5 and TCI state #8, which is the same as the first embodiment.

A third embodiment relates to yet another option for determining the default TCI state(s) for in-carrier PDSCH scheduling in NCJT mode.

According to the third embodiment, the default TCI state(s) for the reception of the scheduled PDSCH are determined when the same three conditions as in the first embodiment are met.

The third embodiment differs from the first embodiment or the second embodiment in that the default TCI state(s) for the reception of the scheduled PDSCH are determined in a same manner for both the CORESET transmitting the DCI scheduling the PDSCH for which tci-PresentInDCI or tci-PresentInDCI-ForFormat1_2 is not configured and the CORESET transmitting the DCI scheduling the PDSCH for which tci-PresentInDCI set as 'enable' or tci-PresentInDCI-ForFormat1_2 is configured.

As described above, the UE is required to maintain three different default beams for PDSCH reception according to the first embodiment while the UE is required to maintain two different default beams for PDSCH reception according to the second embodiment. According to the third embodiment, the UE would be required to only maintain one default beams for PDSCH reception. According to the third embodiment, for the CORESET transmitting the DCI scheduling the PDSCH (no matter whether or not tci-PresentInDCI or tci-PresentInDCI-ForFormat1_2 is configured for the CORESET), the default TCI state for the reception of the scheduled PDSCH is determined by one of the TCI states activated in the activation command (e.g. PDSCH TCI state activation/deactivation MAC CE). In particular, when at least one of configured TCI states for the serving cell of scheduled PDSCH contains the 'QCL-TypeD', the UE may assume that the DM-RS ports of the scheduled PDSCH of a serving cell are QCLed with the RS(s) with respect to the QCL parameter(s) associated with one TCI state (preferably the first TCI state) pointed to by the lowest codepoint among the codepoints pointing to two different TCI states.

An example of the third embodiment is described as follows:

Suppose that the same PDSCH TCI state activation/deactivation MAC CE as in the first embodiment is received for the current active BWP of the serving cell.

Also the same as the first embodiment, three CORESETs, e.g. CORESET #1, CORESET #2 and CORESET #3, are configured for the activate BWP of the serving cell for a UE, where tci-PresentInDCI is not configured for CORESET #1, CORESET #2 and tci-PresentInDCI is set as 'enable' for CORESET #3.

According to the third embodiment, if a UE receives a DCI with format 1_1 transmitted from CORESET #1 or CORESET #2 or CORESET #3 scheduling a PDSCH with scheduling offset smaller than the threshold timeDurationForQCL, the UE may assume that the DM-RS ports of the scheduled PDSCH are QCLed with the RS(s) with respect to the QCL parameter(s) associated with TCI state #5 or TCI state #8. The TCI state #5 is preferable as it is the first TCI state of the TCI states pointed to by the lowest codepoint pointing to two different TCI states.

A fourth embodiment relates to determining the default TCI state(s) for cross-carrier scheduling in NCJT mode.

According to the fourth embodiment, the default TCI state(s) for the reception of the scheduled PDSCH are determined when the following three conditions are met:

(1) A DCI carried in PDCCH schedules a PDSCH transmission on a different carrier from that of the PDCCH (i.e. cross-carrier scheduled PDSCH). In other words, the PDCCH carrying the scheduling DCI is received on one component carrier, while the PDSCH scheduled by that DCI is on another component carrier. The time offset between the reception of the DL DCI and the scheduled PDSCH is less than the threshold timeDurationForQCL. The timeDurationForQCL is determined based on the subcarrier spacing of the scheduled PDSCH. If the sub-carrier space of the carrier transmitting the PDCCH ($\mu_{PDCCH}$) is smaller than the sub-carrier space of the carrier transmitting the PDSCH ($\mu_{PDSCH}$), i.e., $\mu_{PDCCH} < \mu_{PDSCH}$, an additional timing delay d is added to the timeDurationForQCL as defined in NR Release 15.

(2) The PDCCH is transmitted in one of the CORESETs within the active BWP of the serving cell monitored by the UE. Some CORESETs are configured with tci-PresentInDCI set as 'enable' or tci-PresentInDCI-ForFormat1_2 while some other CORESETs are not configured with tci-PresentInDCI or tci-PresentInDCI-ForFormat1_2.

(3) An activation command (e.g. a PDSCH TCI state activation/deactivation MAC CE) is received to indicate eight codepoints pointing to TCI state(s) to be activated. At least one codepoint points to two different TCI states; and each of the other codepoints may point to one or two TCI states.

According to the fourth embodiment, for the CORESET transmitting the DCI scheduling the PDSCH (no matter whether or not tci-PresentInDCI or tci-PresentInDCI-ForFormat1_2 is configured for the CORESET), the default TCI state(s) for the reception of the scheduled PDSCH are determined by ones of the TCI states activated in the activation command (e.g. PDSCH TCI state activation/deactivation MAC CE). In particular, when at least one of configured TCI states for the serving cell of scheduled PDSCH contains the 'QCL-TypeD', the UE may assume that the DM-RS ports of the scheduled PDSCH of a serving cell are QCLed with the RS(s) with respect to the QCL parameter(s) associated with the TCI states pointed to by the lowest codepoint among the codepoints pointing to two different TCI states. Incidentally, when none of the configured TCI states for the serving cell of scheduled PDSCH contains the 'QCL-TypeD', the UE shall obtain the other QCL assumptions from the indicated TCI states for its scheduled PDSCH irrespective of the time offset between the reception of the DL DCI and the corresponding PDSCH and no default beam is necessary to be determined.

An example of the fourth embodiment is described as follows:

A UE receives a DCI carried in PDCCH transmitted on CC #1 scheduling a PDSCH transmitted on CC #2. Suppose that the following PDSCH TCI state activation/deactivation MAC CE is received for the current active BWP of CC #2, and at least one of configured TCI states for the serving cell of scheduled PDSCH contains the 'QCL-TypeD':

{
  TCI field with value of '000' codepoint points to TCI state#1,
  TCI field with value of '001' codepoint points to TCI state#2,
  TCI field with value of '010' codepoint points to TCI state#5 and TCI state#8,
  TCI field with value of '011' codepoint points to TCI state#11,
  TCI field with value of '100' codepoint points to TCI state#38,
  TCI field with value of '101' codepoint points to TCI state#52,
  TCI field with value of '110' codepoint points to TCI state#65 and TCI state#88,
  TCI field with value of '111' codepoint points to TCI state#110
}

The UE may assume that the DM-RS ports of the scheduled PDSCH are QCLed with the RS(s) with respect to the QCL parameter(s) associated with TCI state #5 and TCI state #8 when the scheduling offset is less than the timeDurationForQCL.

A fifth embodiment relates to another option for determining the default TCI state(s) for cross-carrier PDSCH scheduling in NCJT mode.

According to the fifth embodiment, the default TCI state(s) for the reception of the scheduled PDSCH are determined when the same three conditions as in the fourth embodiment are met.

Different UE capabilities may be reported for different cells by the UE. The fifth embodiment takes this into consideration. For example, when UE can support NCJT in CC #2 (on which the scheduled PDSCH will be transmitted) while cannot support NCJT in CC #1 (on which the PDCCH carrying the scheduling DCI is transmitted), if the scheduling offset is less than the threshold, the UE may receive the PDSCH by using a single default TCI state.

When a UE receive a DCI carried in PDCCH on a cell without NCJT capability scheduling a PDSCH on another cell and the scheduling offset is less than the threshold, according to the fifth embodiment, the default TCI state for the reception of the scheduled PDSCH is determined by one of the TCI states activated in the activation command (e.g. PDSCH TCI state activation/deactivation MAC CE). In particular, when at least one of configured TCI states for the serving cell of scheduled PDSCH contains the 'QCL-TypeD', the UE may assume that the DM-RS ports of the scheduled PDSCH of a serving cell are QCLed with the RS(s) with respect to the QCL parameter(s) associated with one TCI state (preferably the first TCI state) pointed to by the lowest codepoint among the codepoints pointing to two different TCI states.

An example of the fifth embodiment is described as follows:

A UE receives a DCI carried in PDCCH transmitted on CC #1 scheduling a PDSCH transmitted on CC #2. Suppose that the same PDSCH TCI state activation/deactivation MAC CE as in the fourth embodiment is received for the current active BWP of CC #2.

According to the fifth embodiment, the UE may assume that the DM-RS ports of the scheduled PDSCH are QCLed with the RS(s) with respect to the QCL parameter(s) associated with TCI state #5 or TCI state #8. The TCI state #5 is preferable as it is the first TCI state of the TCI states pointed to by the lowest codepoint pointing to two different TCI states.

The sixth embodiment relates to determining the default TCI state for cross-carrier aperiodic CSI-RS resource(s) triggering.

Different from the PDSCH transmission in NCJT mode, each CSI-RS resource may only be transmitted from one TRP at a given slot. Therefore, the default TCI state for cross-carrier aperiodic CSI-RS resource(s) triggering should be a single default TCI state.

According to the six embodiment, the default TCI state for the reception of the triggered CSI-RS is determined when the following three conditions are met:

(1) A DCI carried in PDCCH triggers an aperiodic CSI-RS transmission on a different carrier from that of the PDCCH (i.e. cross-carrier triggered aperiodic CSI-RS). In other words, the PDCCH carrying the triggering DCI is received on one component carrier, while the aperiodic CSI-RS resource(s) triggered by that DCI is received on another component carrier. The sub-carrier space of the carrier transmitting the PDCCH ($\mu_{PDCCH}$) is smaller than the sub-carrier space of the carrier transmitting the CSI-RS ($\mu_{CSIRS}$), i.e. the $\mu_{PDCCH} < \mu_{CSIRS}$ The scheduling offset between the last symbol of the PDCCH carrying the triggering DCI and the first symbol of the aperiodic CSI-RS resources configured without higher layer parameter trs-Info and without higher layer parameter repetition is smaller than the UE reported threshold beamSwitchTiming+d in unit of PDCCH symbols. The reported value of beamSwitchTiming indicates the time duration for the UE for beam switching and is one of the values of {14, 28, 48}. The beam switching timing delay d is defined in the following table (Table 5.2.1.5.1a-1 of TS38.214):

TABLE 5.2.1.5.1a-1

Additional beam switching timing delay d

| $\mu_{PDCCH}$ | d [PDCCH symbols] |
|---|---|
| 0 | 8 |
| 1 | 8 |
| 2 | 14 |

(2) There is no other DL signal with an indicated TCI state in the same symbols as the CSI-RS, and no CORESET is configured for the BWP on the cell in which the aperiodic CSI-RS is to be received.

(3) An activation command (e.g. a PDSCH TCI states activation/deactivation MAC CE) is received to indicate eight codepoints pointing to TCI state(s) to be activated. At least one codepoint points to two different TCI states; and each of the other codepoints may point to one or two TCI states.

Incidentally, the condition (2) is included to indicate that only the condition (2) is met, it is necessary to determine a default TCI state. If there is any other DL signal with an indicated TCI state in the same symbols as the CSI-RS, the UE applies the QCL assumption of the other DL signal also when receiving the aperiodic CSI-RS. The other DL signal refers to PDSCH scheduled with offset larger than or equal to the threshold timeDurationForQCL, as defined in [13, TS 38.306], aperiodic CSI-RS scheduled with offset larger than or equal to the UE reported threshold beamSwitchTiming+ d*$\mu_{PDCCH}$ l$\mu_{PDSCH}$ in CSI-RS symbols when the reported value is one of the values {14, 28, 48}, aperiodic CSI-RS scheduled with offset larger than or equal to 48+d when the reported value of beamSwitchTiming is one of the values {224, 336}, periodic CSI-RS, semi-persistent CSI-RS. If at least one CORESET is configured for the BWP in which the aperiodic CSI-RS is to be received, when receiving the aperiodic CSI-RS, the UE applies the QCL assumption used for the CORESET associated with a monitored search space with the lowest ControlResourceSetId in the latest slot in which one or more CORESETs within the active BWP of the serving cell are monitored.

According to the sixth embodiment, the default TCI state for the reception of the triggered CSI-RS is determined by one of the TCI states activated in the activation command (e.g. a PDSCH TCI states activation/deactivation MAC CE). In particular, when at least one of configured TCI states for the serving cell of triggered CSI-RS contains the 'QCL-TypeD', the UE may assume that the CSI-RS resource(s) are QCLed with the RS(s) with respect to the QCL parameter(s) associated with one TCI state (preferably the first TCI state) pointed to by the lowest codepoint among the codepoints pointing to two different TCI states.

An example of the sixth embodiment is as follows:

A UE receives a DCI carried in PDCCH transmitted on CC #1 triggering an aperiodic CSI-RS resource transmitted on CC #2. The following PDSCH TCI states activation/deactivation MAC CE is received for the current active BWP of CC #2, and at least one of configured TCI states for the serving cell of triggered CSI-RS contains the 'QCL-TypeD':

{
TCI field with value of '000' codepoint points to TCI state#1,
TCI field with value of '001' codepoint points to TCI state#2,
TCI field with value of '010' codepoint points to TCI state#5 and TCI state#8,
TCI field with value of '011' codepoint points to TCI state#11,
TCI field with value of '100' codepoint points to TCI state#38,
TCI field with value of '101' codepoint points to TCI state#52,
TCI field with value of '110' codepoint points to TCI state#65 and TCI state#88,
TCI field with value of '111' codepoint points to TCI state#110
}

According to the sixth embodiment, the UE may assume that the triggered CSI-RS are QCLed with the RS(s) with respect to the QCL parameter(s) associated with TCI state #5 or TCI state #8 when the triggering offset between the last symbol of the PDCCH carrying the triggering DCI and the first symbol of the aperiodic CSI-RS resources configured without the higher layer parameter trs-Info and without the higher layer parameter repetition is smaller than the UE reported threshold beamSwitchTiming+d in unit of PDCCH symbols. The TCI state #5 is preferable as it is the first TCI state of the TCI states pointed to by the lowest codepoint pointing to two different TCI states.

Figure 1:
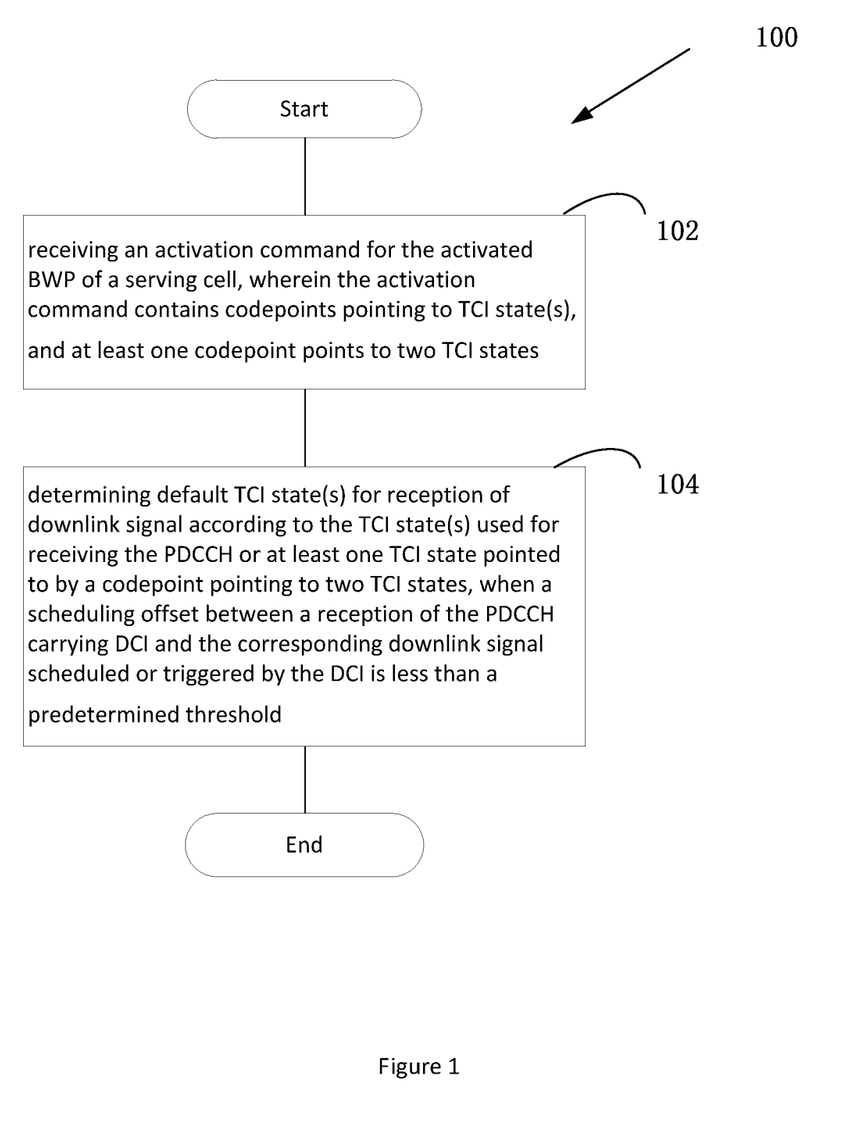
FIG. 1 is a schematic flow chart diagram illustrating an embodiment of a method.

FIG. 1 is a schematic flow chart diagram illustrating an embodiment of a method 100 according to the present application. In some embodiments, the method 100 is performed by an apparatus, such as a remote unit. In certain embodiments, the method 100 may be performed by a processor executing program code, for example, a microcontroller, a microprocessor, a CPU, a GPU, an auxiliary processing unit, a FPGA, or the like.

The method 100 may include 102 receiving an activation command for the activated BWP of a serving cell, wherein the activation command contains codepoints pointing to TCI state(s), and at least one codepoint points to two TCI states; and 104 determining default TCI state(s) for reception of downlink signal according to the TCI state(s) used for receiving the PDCCH or at least one TCI state pointed to by a codepoint pointing to two TCI states, when a scheduling offset between a reception of the PDCCH carrying DCI and the corresponding downlink signal scheduled or triggered by the DCI is less than a predetermined threshold.

Figure 2:
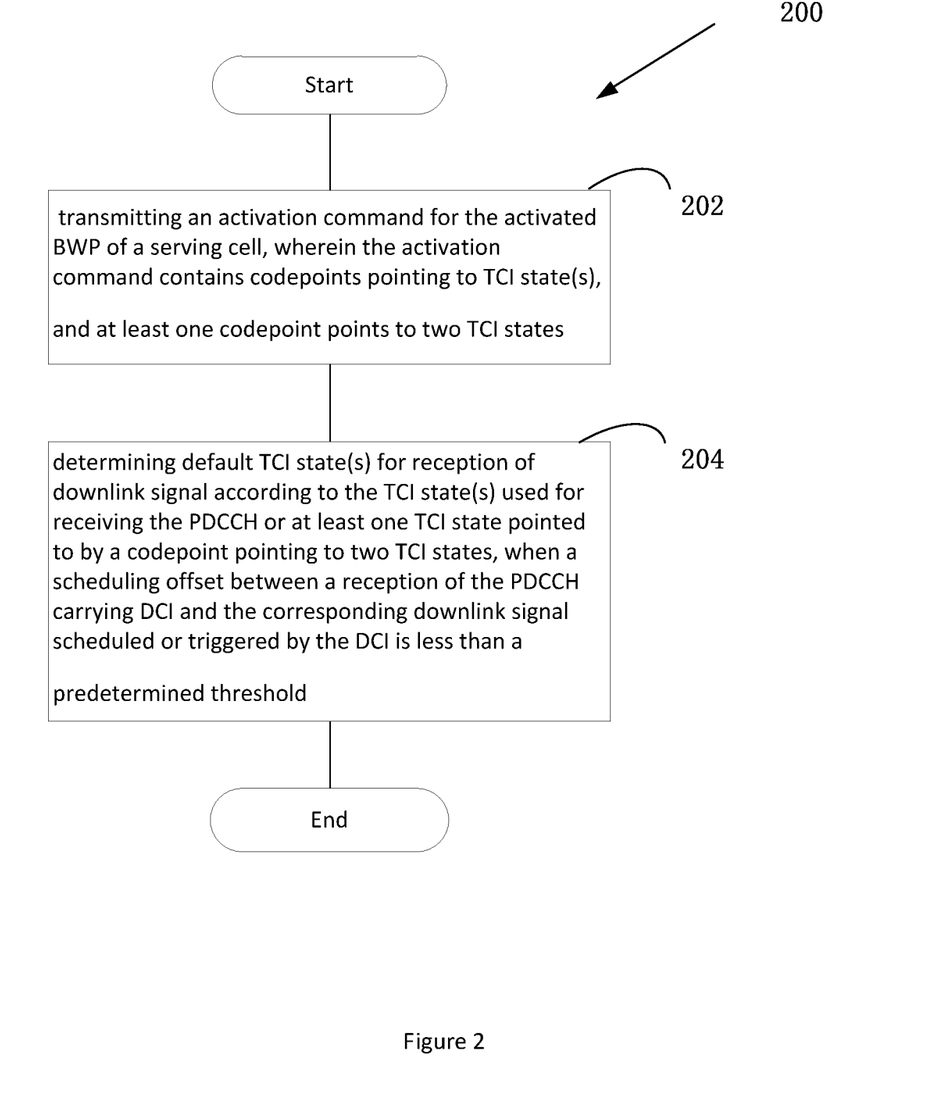
FIG. 2 is a schematic flow chart diagram illustrating a further embodiment of a method.

FIG. 2 is a schematic flow chart diagram illustrating an embodiment of a method 200 according to the present application. In some embodiments, the method 200 is performed by an apparatus, such as a base unit. In certain embodiments, the method 200 may be performed by a processor executing program code, for example, a microcontroller, a microprocessor, a CPU, a GPU, an auxiliary processing unit, a FPGA, or the like.

The method 200 may include 202 transmitting an activation command for the activated BWP of a serving cell, wherein the activation command contains codepoints pointing to TCI state(s), and at least one codepoint points to two TCI states; and 204 determining default TCI state(s) for reception of downlink signal according to the TCI state(s) used for receiving the PDCCH or at least one TCI state pointed to by a codepoint pointing to two TCI states, when a scheduling offset between a reception of the PDCCH carrying DCI and the corresponding downlink signal scheduled or triggered by the DCI is less than a predetermined threshold.

Figure 3:
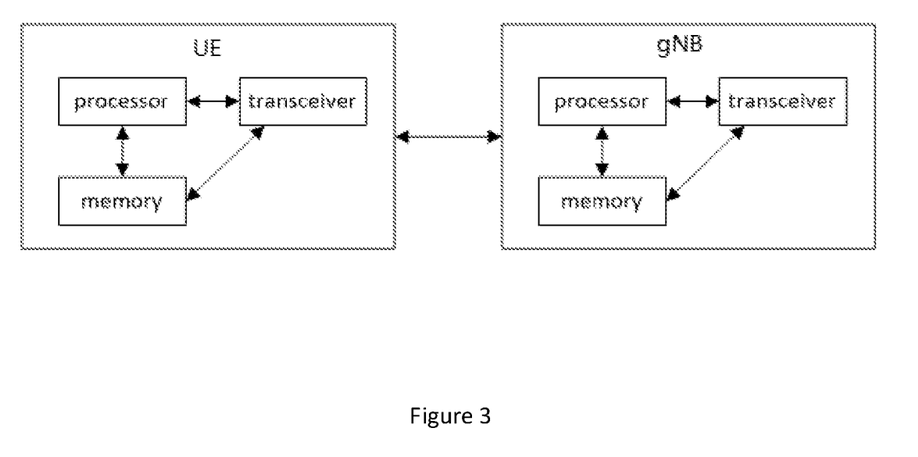
FIG. 3 is a schematic block diagram illustrating apparatuses according to one embodiment.

FIG. 3 is a schematic block diagram illustrating apparatuses according to one embodiment.

Referring to FIG. 3, the UE (i.e. the remote unit) includes a processor, a memory, and a transceiver. The processor implements a function, a process, and/or a method which are proposed in FIG. 1. The gNB (i.e. base unit) includes a processor, a memory, and a transceiver. The processors implement a function, a process, and/or a method which are proposed in FIG. 2. Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

What is claimed is:

1. A method performed by a user equipment (UE), comprising:
receiving an activation command for activating a Bandwidth Part (BWP) of a serving cell of the UE, wherein the activation command comprises codepoints pointing to a set of Transmission Configuration Indication (TCI) states, and wherein at least one codepoint of the codepoints points to two TCI states of the set of TCI states; and
determining, when a scheduling offset between a reception of a Physical Downlink Control Channel (PDCCH) carrying Downlink Control Information (DCI) and a corresponding downlink signal that is scheduled or triggered by the DCI is less than a predetermined threshold, at least one of:
one or more default TCI states for reception of the downlink signal according to one or more TCI states used for receiving the PDCCH, or
at least one TCI state pointed to by a codepoint pointing to two TCI states;
wherein:
the downlink signal comprises one or more aperiodic channel state information reference signal (CSI-RS) resources triggered by the DCI,
the one or more aperiodic CSI-RS resources are configured without a higher layer parameter trs-Info and without a higher layer parameter repetition,
the PDCCH carrying the DCI is transmitted on a different carrier from that of the aperiodic CSI-RS, and
when the scheduling offset comprises a time offset between a last symbol of the PDCCH and a first symbol of the one or more aperiodic CSI-RS resources, the one or more default TCI states for reception of the one or more aperiodic CSI-RS resources is a first TCI state pointed to by a lowest codepoint among the at least one codepoint pointing to two TCI states of the set of TCI states.

2. The method of claim 1, wherein the predetermined threshold is a beam switch timing threshold reported by the UE.

3. The method of claim 1, wherein the PDCCH carrying the DCI is transmitted on a carrier having a subcarrier spacing that is less than a subcarrier spacing of a carrier on which the aperiodic CSI-RS is transmitted.

4. The method of claim 1, wherein no CORESET is configured for the BWP of the serving cell of the UE.

5. The method of claim 1, wherein a TCI state of the set of TCI states contains a quasi-co-location (QCL) Type D.

6. A user equipment (UE) for wireless communication, comprising:
at least one memory; and
at least one processor coupled with the at least one memory and operable to cause the UE to:

receive an activation command for activating a Bandwidth Part (BWP) of a serving cell of the UE, wherein the activation command comprises codepoints pointing to a set of Transmission Configuration Indication (TCI) states, and wherein at least one codepoint of the codepoints points to two TCI states of the set of TCI states; and determine, when a scheduling offset between a reception of Physical Downlink Control Channel (PDCCH) carrying Downlink Control Information (DCI) and a corresponding downlink signal that is scheduled or triggered by the DCI is less than a predetermined threshold, at least one of:
  one or more default TCI states for reception of the downlink signal according to one or more TCI states used for receiving the PDCCH, or
  at least one TCI state pointed to by a codepoint pointing to two TCI states; wherein:
    the downlink signal comprises one or more aperiodic channel state information reference signal (CSI-RS) resources triggered by the DCI,
    the one or more aperiodic CSI-RS resources are configured without a higher layer parameter trs-Info and without a higher layer parameter repetition,
    the PDCCH carrying the DCI is transmitted on a different carrier from that of the aperiodic CSI-RS, and
    when the scheduling offset comprises a time offset between a last symbol of the PDCCH and a first symbol of the one or more aperiodic CSI-RS resources, the one or more default TCI states for reception of the one or more aperiodic CSI-RS resources is a first TCI state pointed to by a lowest codepoint among the at least one codepoint pointing to two TCI states of the set of TCI states.

7. The UE of claim 6, wherein the predetermined threshold is a beam switch timing threshold reported by the UE.

8. The UE of claim 6, wherein the PDCCH carrying the DCI is transmitted on a carrier having a subcarrier spacing that is less than a subcarrier spacing of a carrier on which the aperiodic CSI-RS is transmitted.

9. The UE of claim 6, wherein no CORESET is configured for the BWP of the serving cell of the UE.

10. The UE of claim 6, wherein a TCI state of the set of TCI states contains a quasi-co-location (QCL) Type D.

11. A base station for wireless communication, comprising:
at least one memory; and
at least one processor coupled with the at least one memory and operable to cause the base station to:
  transmit an activation command for activating a Bandwidth Part (BWP) of a serving cell of the base station, wherein the activation command comprises codepoints pointing to a set of Transmission Configuration Indication (TCI) states, and wherein at least one codepoint of the codepoints points to two TCI states of the set of TCI states; and
  determine, when a scheduling offset between a reception of Physical Downlink Control Channel (PDCCH) carrying Downlink Control Information (DCI) and a corresponding downlink signal that is scheduled or triggered by the DCI is less than a predetermined threshold, at least one of:
    one or more default TCI states for reception of the downlink signal according to one or more TCI states used for receiving the PDCCH, or
    at least one TCI state pointed to by a codepoint pointing to two TCI states; wherein:
      the downlink signal comprises one or more aperiodic channel state information reference signal (CSI-RS) resources triggered by the DCI,
      the one or more aperiodic CSI-RS resources are configured without a higher layer parameter trs-Info and without a higher layer parameter repetition,
      the PDCCH carrying the DCI is transmitted on a different carrier from that of the aperiodic CSI-RS, and
      when the scheduling offset comprises a time offset between a last symbol of the PDCCH and a first symbol of the one or more aperiodic CSI-RS resources, the one or more default TCI states for reception of the one or more aperiodic CSI-RS resources is a first TCI state pointed to by a lowest codepoint among the at least one codepoint pointing to two TCI states of the set of TCI states.

12. The base station of claim 11, wherein the predetermined threshold is a beam switch timing threshold reported by a user equipment (UE).

13. The base station of claim 11, wherein the PDCCH carrying the DCI is transmitted on a carrier having a subcarrier spacing that is less than a subcarrier spacing of a carrier on which the aperiodic CSI-RS is transmitted.

14. The base station of claim 11, wherein no CORESET is configured for the BWP of the serving cell.

15. The base station of claim 11, wherein a TCI state of the set of TCI states contains a quasi-co-location (QCL) Type D.

* * * * *